(12) United States Patent
Bokor et al.

(10) Patent No.: US 9,054,862 B2
(45) Date of Patent: Jun. 9, 2015

(54) ACCESS CONTROL KEY MANAGEMENT IN A VIRTUAL WORLD

(75) Inventors: Brian R. Bokor, Raleigh, NC (US); Andrew B. Smith, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 11/935,567

(22) Filed: Nov. 6, 2007

(65) Prior Publication Data

US 2009/0116641 A1 May 7, 2009

(51) Int. Cl.
*H04K 1/00* (2006.01)
*H04L 9/08* (2006.01)
*H04L 29/06* (2006.01)

(52) U.S. Cl.
CPC .............. *H04L 9/088* (2013.01); *H04L 63/061* (2013.01); *H04L 63/10* (2013.01); *H04L 9/0891* (2013.01)

(58) Field of Classification Search
CPC ......................................................... H04L 9/08
USPC .................................................... 380/44, 278
See application file for complete search history.

(56) References Cited

U.S. PATENT DOCUMENTS

| 7,089,425 B2 * | 8/2006 | Chan ............................. 713/189 |
| 2007/0156509 A1 * | 7/2007 | Jung et al. ....................... 705/10 |

* cited by examiner

*Primary Examiner* — Amare F Tabor
(74) *Attorney, Agent, or Firm* — Moore & Van Allen PLLC

(57) ABSTRACT

Access control key management in a virtual world that includes generating a key for access to a virtual space, a service, an event, or an item in a virtual world, assigning one or more parameters to the key, providing the key to an avatar in the virtual world, and accessing the virtual space, the service, or the item by the avatar using the key in accordance with the one or more parameters. The one or more parameters may include a type parameter, a frequency parameter, a duration parameter, or a value parameter. The avatar may be denied access if the duration parameter has expired and may be allowed access while the duration parameter has not expired. The one or more parameters may be determined responsive to rules associated with the virtual space, the service, the event or the item.

22 Claims, 6 Drawing Sheets

ACCESS CONTROL KEY MANAGEMENT IN A VIRTUAL WORLD

BACKGROUND OF THE INVENTION

The present invention is related to access controls keys, and more specifically to access control key management in a virtual world.

Currently, in virtual world environments there exists a problem with minimal types of access control on users to private/controlled items, services, or areas within the virtual world. Users that control avatars in the virtual world that have been given access to an item, a service, an event or a virtual space. The access given is usually static unless a manual action is taken to remove their access. This does not allow for avatars to have temporary access to a given item, service, event or virtual space based on a usage or time period.

BRIEF SUMMARY OF THE INVENTION

According to one aspect of the present invention, a method for access control key management in a virtual world includes generating a key for access to at least one of a virtual space or a event in a virtual world, assigning at least one parameter to the key, providing the key to an avatar in the virtual world, and accessing the at least one of the virtual space or the event by the avatar using the key in accordance with the at least one parameter.

According to another aspect of the present invention, a method for access control key management in a virtual world includes generating a key for access to at least one of a service or an item in a virtual world, assigning at least one parameter to the key, providing the key to an avatar in the virtual world, and accessing the at least one of the service or the item by the avatar using the key in accordance with the at least one parameter.

According to another aspect of the present invention, a system for access control key management in a virtual world includes a server, one or more workstations, and a network interconnecting the server and one or more workstations, wherein the server hosts a virtual world allowing a user at the one or more workstations to control an avatar in the virtual world to use a key to access an item, a service, an event or a virtual space. An administrator may use the one or more workstations to perform access control key management in the virtual world that includes generating a key for access to a virtual space in a virtual world, assigning at least one parameter to the key, and providing the key to an avatar in the virtual world, wherein the avatar is allowed access to the virtual space by using the key in accordance with the at least one parameter.

According to a further aspect of the present invention, a computer program product comprises a computer useable medium having computer useable program code embodied therewith, the computer useable program code comprising computer useable program code configured to generate a key for access to an item, a service, an event or a virtual space in a virtual world, computer useable program code configured to assign at least one parameter to the key, computer useable program code configured to provide the key to an avatar in the virtual world, and computer useable program code configured to allow accessing the item, the service, the event or the virtual space by the avatar using the key in accordance with the at least one parameter.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
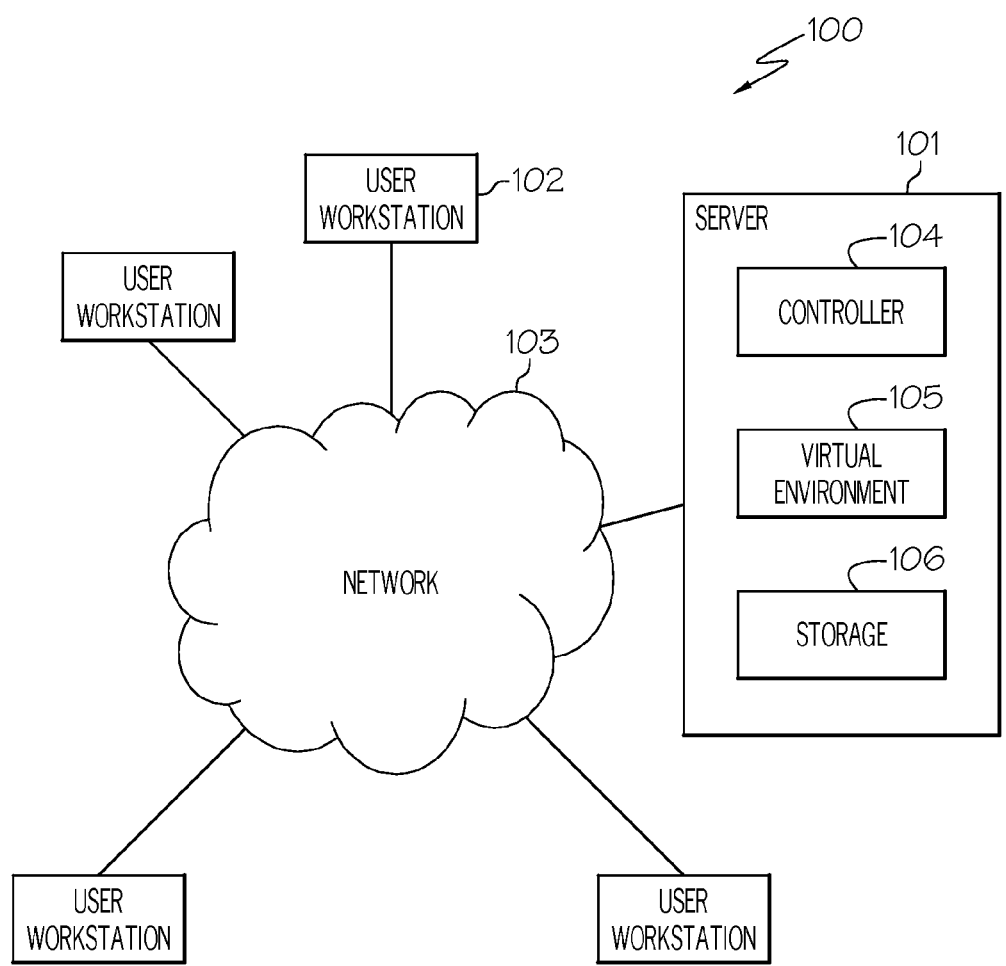
FIG. 1 is a diagram of system for access control key management in a virtual world according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, an access to an item, a service, an event or a virtual space within a virtual world may be given an expiration time that controls the access of an avatar. Access is provided via a key that contains parameters defining details and limits on the access given. One of these parameters may include information regarding an expiration time which once reached, would prevent an avatar from having access. This improves management and possible uses of private/controlled items, services, events or virtual spaces within virtual worlds. There are various private/controlled items, services, events and/or virtual spaces that may be created within a virtual world. According to embodiments of the present invention, a unique access key is generated that is linked to the item, the service, the event or the virtual space desired for access.

The key may include one or more key parameters that define details or restrictions of the related access. For example, a key may have a type parameter that may include information regarding a description and/or location of the item, the service, the event or the virtual space that access is being provided, a frequency parameter that may include information regarding repetitive dates or time periods that access is allowed or a set period that access is allowed (e.g., monthly, weekly, one time only, every third Wednesday, etc.), a value parameter that may include a time duration within the frequency or period that access is allowed (e.g., one hour, unlimited, between 6 pm and 10 pm, etc.), a value parameter that may include information regarding a cost structure for the key (e.g., free, one-time cost, subscription, dollar amount, etc.), or any other type parameters.

Once the key is generated with the appropriate key parameters, the key may then be sold or otherwise distributed to an avatar as a token allowing the avatar access to the item, the service, the event, the virtual space, etc. in accordance with the key parameters. The unique access key along with the parameters may be generated by a key administrator or may be generated by an entity that controls or owns access to the item, the service, the event or the virtual space. In this regard, a key may be requested by a user for access to an item, a service, an event or a virtual space, and an administrator or entity owning or controlling access may then generate the unique access key in response to the request from the user.

Moreover, according to embodiments of the present invention, once a key is generated and provided to a user controlling an avatar in a virtual world, the user may be notified that access is about to be activated just before access is being activated on the key allowing access to an item, a service, an event or a virtual space. For example, if the access key allows an avatar controlled by a user to access an arena where a concert may be taking place on a Friday between the hours of 7:00 pm and 10:00 pm, the user may be notified a time period before 7:00 p.m. (e.g., 1-2 hours before 7:00 pm, 30 min before 7:00 pm, etc.) that access to the arena (i.e., a virtual space) is imminent and will be activated on the key at 7:00 p.m. This notification may occur automatically, or may be selected or requested by the user. Similarly, notification that time is about to expire for access to an item, a service, an event or a virtual space may also be given to a user prior to the access expiring. According to embodiments of the present invention, a user may then be prompted whether they desire to increase their access time, if available for that specific key usage. If so, and the request is granted, appropriate key parameters may be updated to change the expiration time on the key and allow the user increased access. In addition, according to embodiments of the present invention, the unique access key may include security features requiring validation of authenticity of the key before access is allowed. For example, the key may be encrypted or provided with any other type of security mechanism. Therefore, before access is allowed to the avatar, the key may be validated and authenticated.

In addition, according to embodiments of the present invention, an avatar may be automatically transferred to a location of an item, a service, an event or a virtual space immediately upon activation of access on the key. Similarly, upon expiration of access, an avatar may be promptly removed or denied access to the item, the service, the event or the virtual space. The transferring may be prompted by a user initiating it (e.g., pushing a button) or may occur automatically.

Further, according to embodiments of the present invention, the key parameters associated with the access key may be determined based on rules procedures etc. associated with the item, the service, the event or the virtual space that access is desired to. For example, if a request from a user is for an access key allowing access to an item such as a movie rental, rules or procedures associated with a provider of the item (i.e., movie compact disk (CD)), may provide movie rentals at a business that may not be open until 10:00 a.m. and close at 5:00 p.m. Monday through Friday. Accordingly, parameters associated with the access key may take these rules into consideration where the parameters have information allowing the access key access to the movie rental item during the specific hours when the business is open.

According to embodiments of the present invention, generation and use of specific access keys may apply to various scenarios. For example, a series of keys may be generated for an auditorium hosting a virtual concert. Each key may be for an assigned seat, all keys for unassigned seats, or a combination thereof. Users or avatars could purchase these keys to attend the auditorium venue at the specified time and location. In another example scenario, a series of keys may be generated for a reoccurring educational course on a virtual college campus. This would allow students enrolled to attend class in this virtual space (i.e., classroom on the virtual college campus), but prohibit un-enrolled students from attending, thus enabling better scheduling and course management. In addition, a scenario may occur where a user or an avatar may desire specific access keys for their own personal space to have private parties and invitees for a given period, without having to worry about managing access afterwards. In addition, a company may use specific access keys to effectively manage conference rooms more effectively, ensuring only the appropriate individuals have appropriate access.

FIG. 1 shows a diagram of system for access control key management in a virtual world according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to access a service, an item, an event or a virtual space. An owner or supplier of the service, the item, the event or the virtual space may also access the virtual world or environment 105, hosted on the server 101, via one or more workstations 102 and control an avatar to provide or restrict access to the service, the item, the event or the virtual space.

Figure 2:
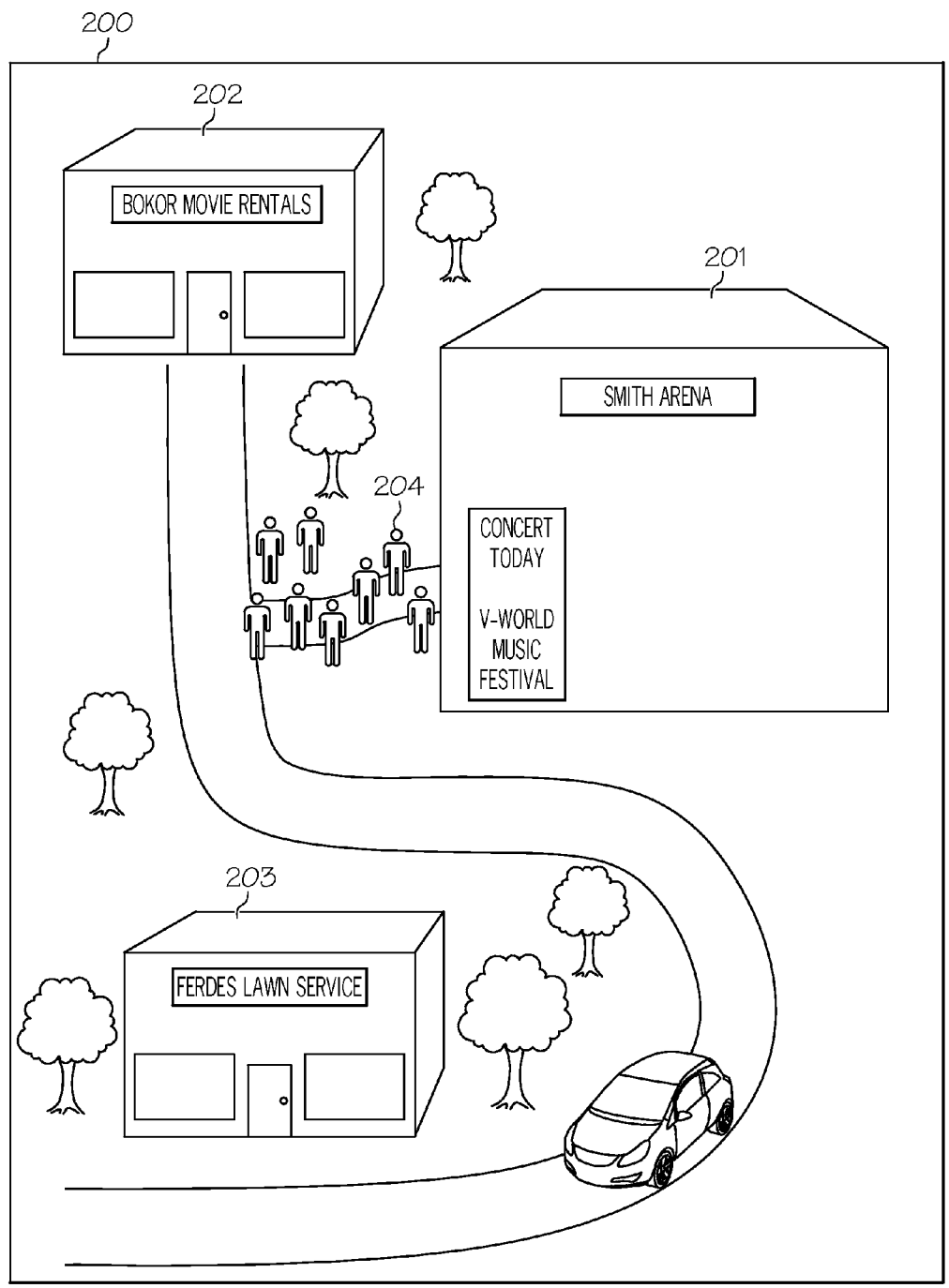
FIG. 2 is a diagram of virtual environment for access control key management according to an example embodiment of the present invention.

FIG. 2 shows a diagram of virtual environment for access control key management according to an example embodiment of the present invention. In the virtual environment/world 200 there may exist an environment containing buildings, stores, trees, cars, people (represented by avatars) and any other items that currently exist in the real world. For example, a virtual world may contain virtual businesses, stores, venues, or spaces 201, 202, 203 that allow an avatar 204 access to a service, an item, an event or a virtual space. Thus, the avatar may have purchased or otherwise obtained a key that provides a holder of the key with access to a service, an item, an event or a virtual space as defined by parameters of the key. These parameters may include, for example, a type parameter that may include a description and/or location of the service, the item, the event or the virtual space where access is allowed, a frequency parameter that may include information related to dates or repeating dates or periods that access is allowed, a duration parameter that may include specific time frames within the frequency that access is allowed, etc.

In this example embodiment, a user may have obtained a key that allows an avatar 204 of the user to access a virtual space "Smith Arena" 201 to view a music festival. The user may also obtain a key that allows the avatar access to an item, for example, a movie rental in a business "Bokor's Movie Rentals" 202, or a service, for example, a grass cutting service or a shrub maintenance service from a service provider "Ferdes Lawn Service" 203. The avatar's access is based on the parameters of the key providing the access and may be unlimited, or restricted to certain days of the week, times of the year or month, time durations, or hours of a day in accordance with the parameters. Should access expire, a user may request that the parameters on the key be updated to allow more access time. Moreover, according to embodiments of the present invention, the parameters may be updated manually of automatically by a controller of the access. For example, if a key has parameters allowing an avatar holder of the key access to a virtual space to attend a concert on a Friday, but the date of the concert has been moved to Saturday, the key parameters may be updated to revise the allowed access to be active on Saturday.

Figure 3:
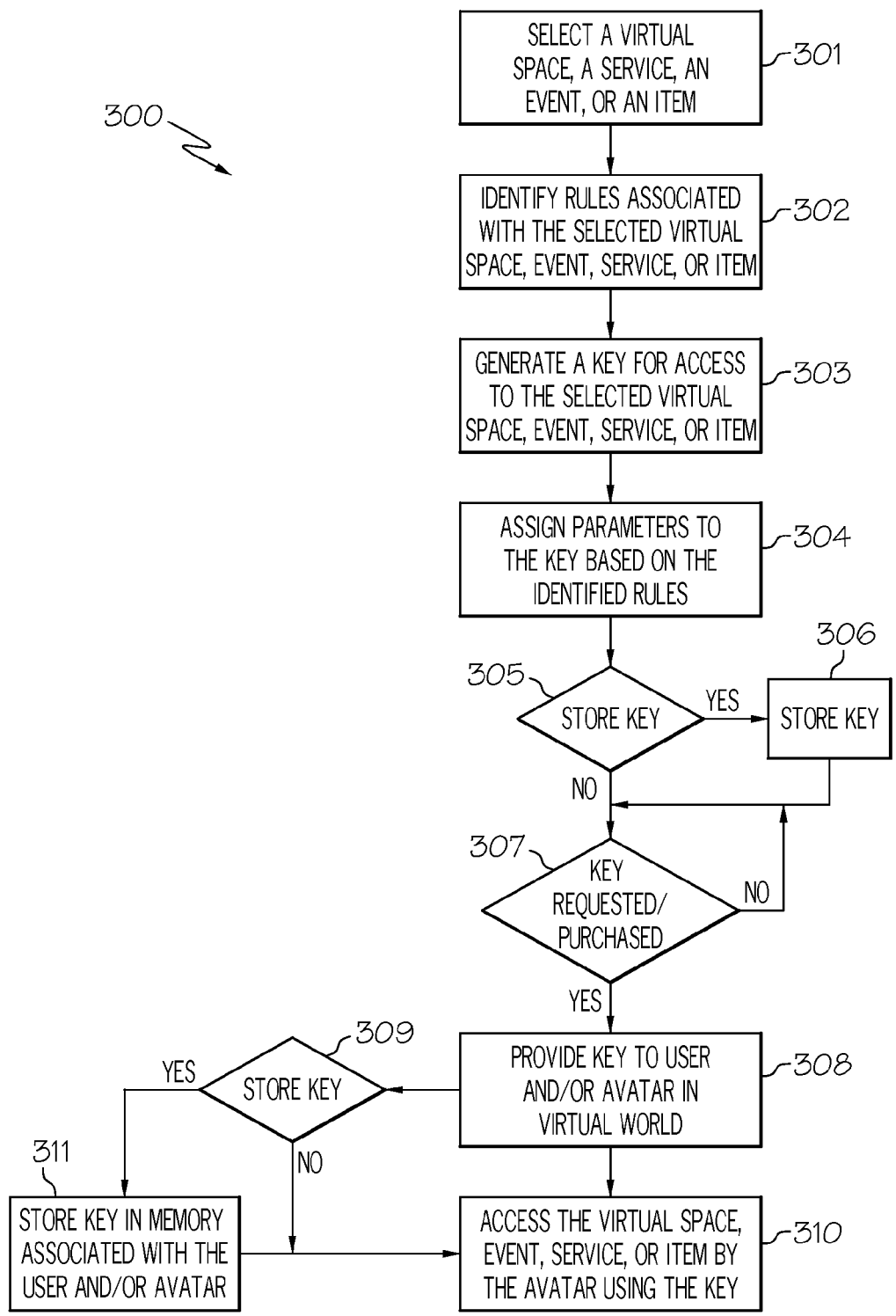
FIG. 3 is a flowchart of a process for access control key management according to an example embodiment of the present invention.

FIG. 3 shows a flowchart of a process for access control key management according to an example embodiment of the present invention. In the process 300, in block 301 a virtual space, a service, an event or an item may be selected. In block 302, rules associated with the selected virtual space, the service, the event, or the item may be identified. In block 303, a key may be generated for access to the selected virtual space, service, event, or item. In block 304, parameters may be assigned to the key based on the identified rules. In block 305, it may be decided whether it is desired to store the key and if so, in block 306, the key may be stored in a memory. If it is not desired that the key be stored, or after storing of the key, in block 307 it may be determined whether the key has been requested or has been purchased by a user and if not, the process remains at this point. In block 307 if the key has been requested or purchased, then in block 308, the key may be provided to a user controlling an avatar in a virtual world. In block 309, the user may decide whether to store the key and if not, in block 310, the user may control the avatar to access the virtual space, the service, the event or the item using the key. If the user decides to store the key, in block 311, the user may store the key in a memory associated with the user or avatar and then in block 310, control the avatar to access the virtual space, the service, the event or the item using the key in accordance with the assigned parameters.

According to embodiments of the present invention, the processes performed in blocks 301-308 may be performed by a key administrator or manager. Further, the processes 309-311 may be performed by a user and/or an avatar being controlled by the user. Moreover, multiple keys may be pre-generated for providing access to a virtual space, a service, an event or an item where the pre-generated keys are stored and provided by a key administrator or manager upon receiving a request from a user and/or avatar. For example, keys may be pre-generated that allow access to a rock concert and each key distributed only when requested or purchased. In this example, the pre-generated keys may each provide access to a unique seat at the rock concert, or may be generated with no specific seating assignment. In addition, according to embodiments of the present invention, a key may be generated only upon a specific request from a user and/or avatar.

Figure 4:
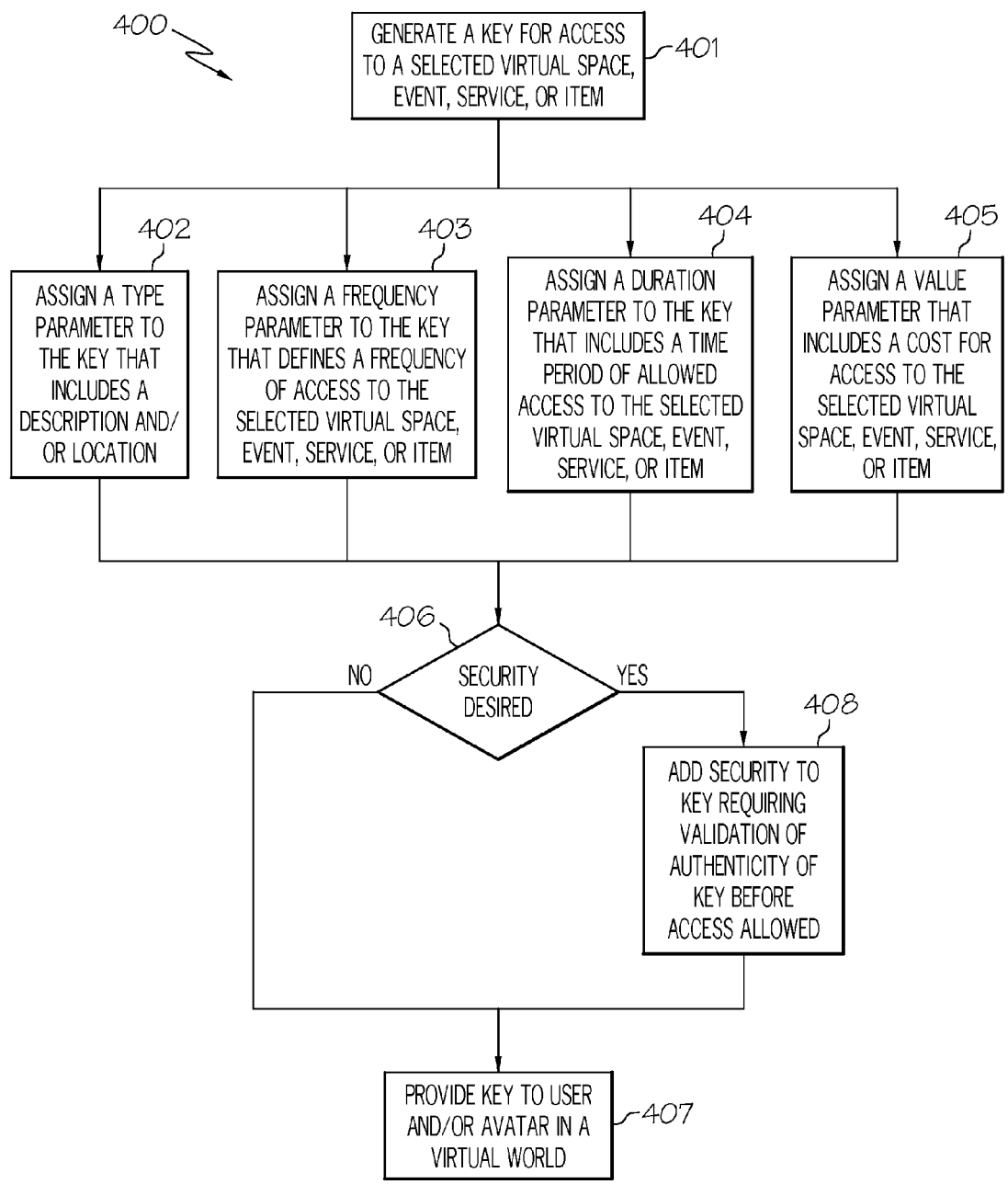
FIG. 4 is a flowchart of a process for assigning parameters to an access control key according to an example embodiment of the present invention.

FIG. 4 shows a flowchart of a process for assigning parameters to an access control key according to an example embodiment of the present invention. In the process 400, in block 401, a key may be generated for access to a virtual space, a service, an event or an item. After key generation, one or more parameters with associated information may be assigned to the key. For example, in block 402, a type parameter may be assigned to the key that includes a description and/or location of the space, the service, or the item to be accessed. Further, in block 403 a frequency parameter may be assigned to the key that may define a frequency of access to the virtual space, the service, the event or the item. Moreover, in block 404, a duration parameter may be assigned to the key that may include a time period of allowed access to the selected virtual space, service, event or item. Also, in block 405, a value parameter may be assigned to the key that may include a cost for purchasing the key allowing access to the selected virtual space, service, event or item. In block 406, it may be determined whether security is desired to be added to the access key and if not, in block 407, the key may be provided to a user and/or an avatar in a virtual world. In block 406, if security is desired, then in block 408, security may be added to the key requiring validation of authenticity of the key before access is allowed using the key.

Figure 5:
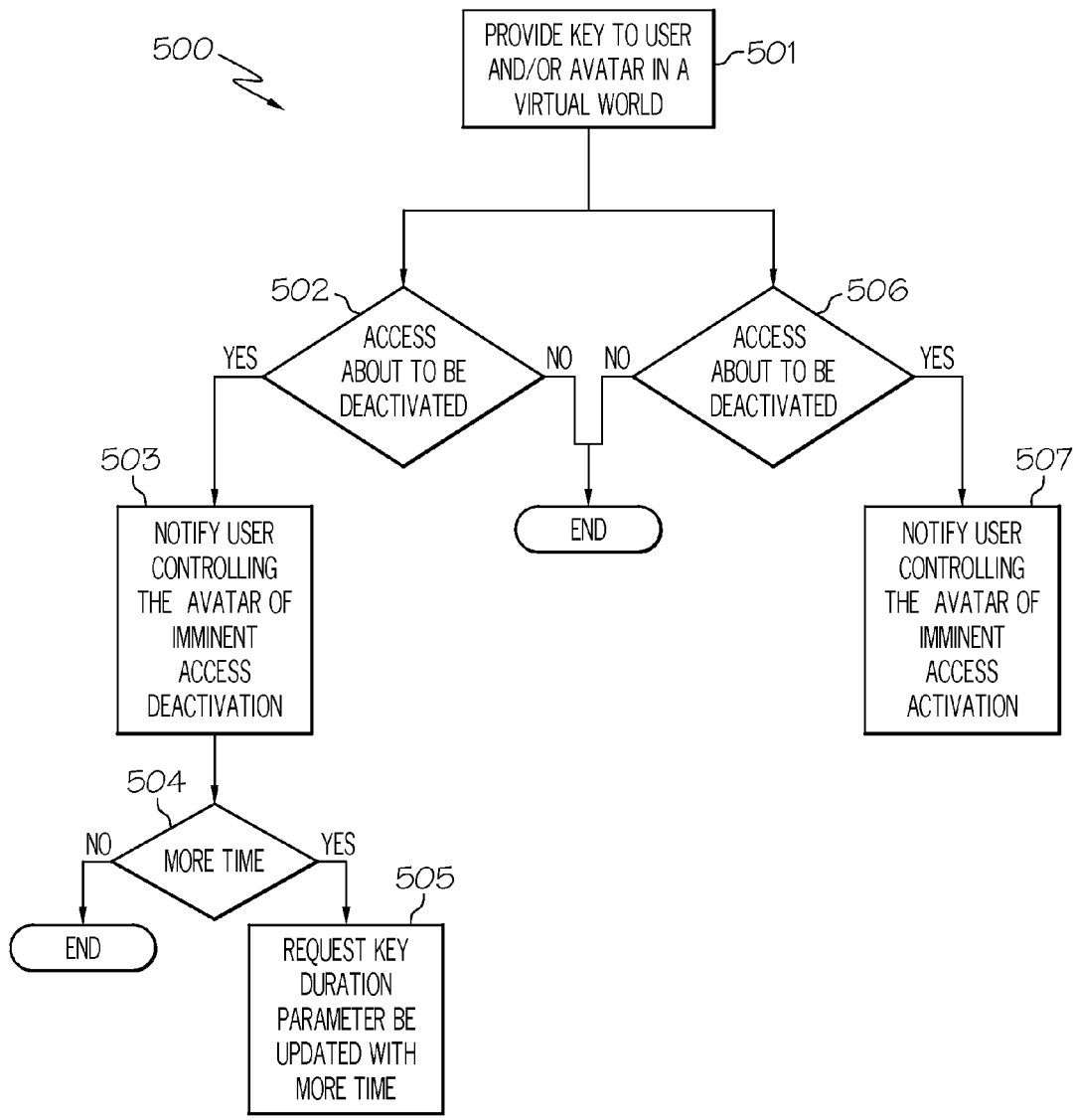
FIG. 5 is a flowchart of a process for access key activation/deactivation notification according to an example embodiment of the present invention.

FIG. 5 shows a flowchart of a process for access key activation/deactivation notification according to an example embodiment of the present invention. In the process 500, in block 501, an access key may be provided to a user or an avatar in a virtual world. In block 502, it may be decided if access using the access key is about to be deactivated and if not the process ends. If it determined that access is about to be deactivated, then in block 503, a user controlling the avatar may be notified of imminent access deactivation of the access key. In block 504, upon receiving notification, the user may determine whether they want more time to increase their access and if not, the process ends. If the user decides they desire more time and want increased access, then in block 505, the user may request that the key parameters be updated with more time allowing extended access. After the key has been provided to the user or the avatar in a virtual world, in block 506 it may be determined whether access using the key is about to be activated and if not, the process ends. If access is about to be activated, then in block 507, the user controlling the avatar may be notified of imminent access activation of the key. The notifications to the user may be manual or may be automatic. Regarding manual notification, this may occur due to a user selecting a notification option or other manual selection requesting the notification. Further, the notification may be automatically provided by the key as determined by an administrator or controller of the key.

Figure 6:
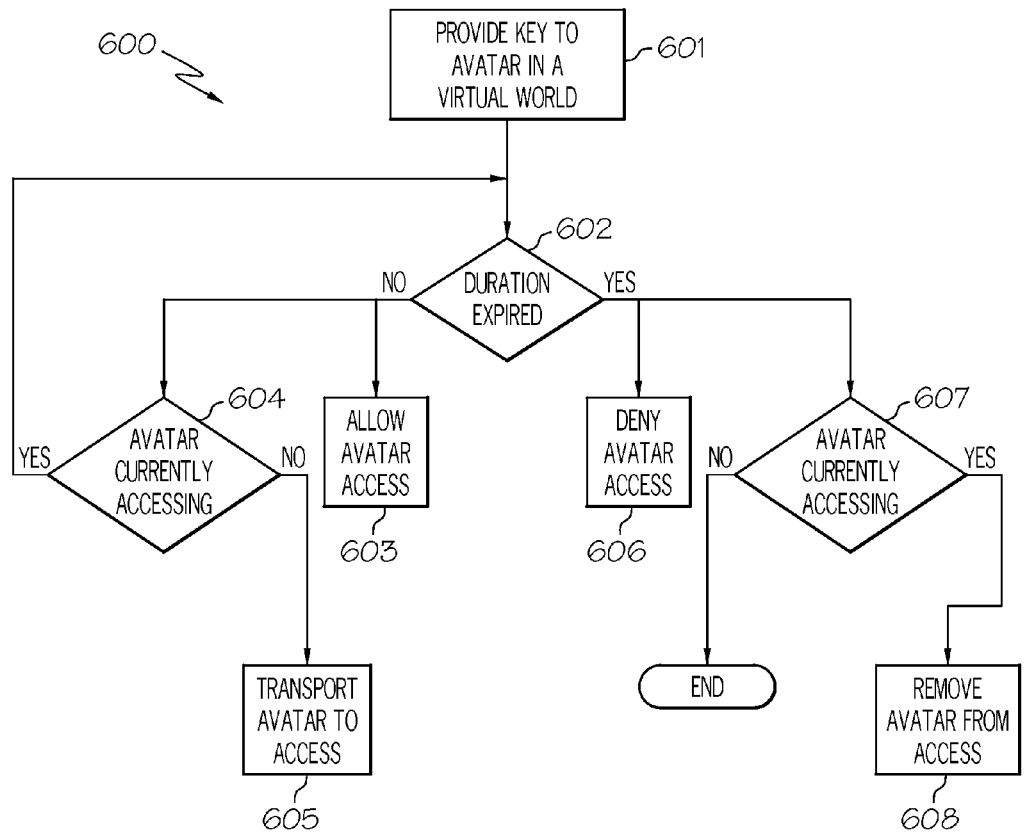
FIG. 6 is a flowchart of a process for allowing or denying access according to an example embodiment of the present invention.

FIG. 6 shows a flowchart of a process for allowing or denying access according to an example embodiment of the present invention. In the process 600, in block 601, a key may be provided to an avatar in a virtual world. In block 602 it may be determined if a duration of allowed access associated with the key has expired and if not, in block 603 an avatar holding the key may be allowed access. Further, if the duration has not expired, in block 604, it may be determined if the avatar is currently accessing the item, the service, the event or the virtual space, and if so, the process returns to block 602. If the avatar is not currently accessing then, in block 605, the avatar may be transported to a location to access the item, the service, the event or the virtual space.

If in block 602, the duration has expired, then in block 606, the avatar may be denied access to the item, the service, the event or the virtual space. Further, if the duration has expired, in block 607 it may be determined whether the avatar is currently accessing the item, the service, the event or the virtual space, and if not, the process ends. If the avatar is currently accessing, then in block 608, the avatar may be removed from access.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for access control key management in a virtual world comprising:
   generating a key for access for at least one of a virtual space or an event in a virtual world;
   assigning at least one parameter to the key;
   providing the key to an avatar in the virtual world;
   automatically transferring the avatar to the virtual space or the event in response to activation of access to the at least one of the virtual space or the event on the key; and
   accessing the at least one of the virtual space or the event by the avatar using the key in accordance with the at least one parameter.

2. The method according to claim 1, further comprising assigning at least one parameter to the key comprising at least one of a type parameter comprising at least one of a description and location, a frequency parameter defining a frequency of access to the at least one of the virtual space or the event, a duration parameter comprising a time period of allowed access to the at least one of the virtual space or the event, or a value parameter comprising a cost for accessing the at least one of the virtual space or the event.

3. The method according to claim 2, further comprising denying the avatar access to the at least one of the virtual space or the event if the duration parameter has expired.

4. The method according to claim 2, further comprising allowing the avatar access to the at least one of the virtual space or the event while the duration parameter has not expired.

5. The method according to claim 2, further comprising removing the avatar from the at least one of the virtual space or the event if the duration parameter has expired.

6. The method according to claim 1, further comprising notifying a user controlling the avatar of imminent access to the at least one of the virtual space or the event based on the at least one parameter of the key.

7. The method according to claim 1, further comprising notifying a user controlling the avatar of imminent expiration of access to the at least one of the virtual space or the event based on the at least one parameter of the key.

8. The method according to claim 7, further comprising prompting the user controlling the avatar whether to request updating the key with more time to access to the virtual space or the event.

9. The method according to claim 1, further comprising removing the avatar from the at least one of the virtual space or the event responsive to access to the at least one of the virtual space or the event becoming inactive on the key.

10. The method according to claim 1, further comprising storing the key with the at least one parameter.

11. The method according to claim 1, further comprising identifying rules associated with the at least one of the virtual space or the event and determining the at least one parameter assigned to the key responsive to the identified rules.

12. The method according to claim 1, further comprising providing security on the key requiring validation of authenticity of the key before allowing the accessing the at least one of the virtual space or the event by the avatar using the key.

13. A method for access control key management in a virtual world comprising:
   generating a key for access to at least one of a service or an item in a virtual world;
   assigning at least one parameter to the key;
   providing the key to an avatar in the virtual world;
   automatically transferring the avatar to a location of the service or item in the virtual world in response to activation of access to the at least one of the service or item on the key; and
   accessing the at least one of the service or the item by the avatar using the key in accordance with the at least one parameter.

14. The method according to claim 13, further comprising assigning at least one parameter to the key comprising at least one of a type parameter comprising at least one of a description and location, a frequency parameter defining a frequency of access to the service or the item, a duration parameter comprising a time period of allowed access to the service or the item, or a value parameter comprising a cost for accessing the service or the item.

15. The method according to claim 14, further comprising denying the avatar access to the at least one of the service or the item if the duration parameter has expired.

16. The method according to claim 14, further comprising allowing the avatar access to the at least one of the service or the item while the duration parameter has not expired.

17. The method according to claim 13, further comprising notifying a user controlling the avatar of imminent access to the at least one of the service or the item based on the at least one parameter of the key.

18. The method according to claim 13, further comprising notifying a user controlling the avatar of imminent expiration of access to the at least one of the service or the item based on the at least one parameter of the key.

19. The method according to claim 18, further comprising prompting the user controlling the avatar whether to request updating the key with more time to access to the at least one of the service or the item.

20. The method according to claim 13, further comprising storing the key with the at least one parameter.

21. The method according to claim 13, further comprising identifying rules associated with the at least one of the service or the item and determining the at least one parameter assigned to the key responsive to the identified rules.

22. The method according to claim 13, further comprising providing security on the key requiring validation of authenticity of the key before allowing the accessing the at least one of the service or the item by the avatar using the key.

* * * * *